United States Patent
Ichitsubo

(10) Patent No.: US 7,925,227 B2
(45) Date of Patent: Apr. 12, 2011

(54) MULTI-BAND AMPLIFIER MODULE WITH HARMONIC SUPPRESSION

(75) Inventor: Ikuroh Ichitsubo, Sagamihara (JP)

(73) Assignee: Micro Mobio Corporation, Palo Alto, CA (US)

( * ) Notice: Subject to any disclaimer, the term of this patent is extended or adjusted under 35 U.S.C. 154(b) by 498 days.

(21) Appl. No.: 11/858,106

(22) Filed: Sep. 19, 2007

(65) Prior Publication Data

US 2009/0075608 A1    Mar. 19, 2009

(51) Int. Cl.
*H04B 1/04*       (2006.01)
(52) U.S. Cl. .................... 455/114.1; 455/127.4
(58) Field of Classification Search ............... 455/552.1, 455/553.1, 91, 114.1, 115.1, 126, 127.1–127.4
See application file for complete search history.

(56) References Cited

U.S. PATENT DOCUMENTS

| | | | | |
|---|---|---|---|---|
| 6,151,509 | A * | 11/2000 | Chorey ...................... | 455/552.1 |
| 6,288,606 | B1 * | 9/2001 | Ekman et al. ................ | 455/126 |
| 6,625,470 | B1 * | 9/2003 | Fourtet et al. .............. | 455/127.4 |
| 7,155,251 | B2 * | 12/2006 | Saruwatari et al. ........ | 455/552.1 |
| 7,580,687 | B2 * | 8/2009 | Ichitsubo et al. .......... | 455/127.1 |
| 2004/0127185 | A1 | 7/2004 | Abrahams | |

\* cited by examiner

*Primary Examiner* — Thanh C Le
(74) *Attorney, Agent, or Firm* — SV Patent Service

(57) ABSTRACT

An amplifier circuit includes a first power amplifier that can produce a first amplified signal in response to a first input signal in a first frequency band, and a second power amplifier that can produce a second amplified signal in response to a second input signal in a second frequency band. A center frequency of the second frequency band is higher than the a center frequency of frequency band A control circuit can turn on or turn off the first power amplifier and configured to turn on or turn off the second power amplifier. A shunting circuit is coupled to an output of the second power amplifier. The shunting circuit can attenuate harmonic signals from the first frequency band under the control of the control circuit.

21 Claims, 5 Drawing Sheets

MULTI-BAND AMPLIFIER MODULE WITH HARMONIC SUPPRESSION

BACKGROUND

The present invention related to power amplifiers, and more particularly, to power amplifiers capable of communicating in two or more frequency bands.

Portable devices such as laptop personal computers, Personal Digital Assistant (PDA) and cellular phones with wireless communication capability are being developed in ever decreasing size for convenience of use. Correspondingly, the electrical components thereof must also decrease in size while still providing effective radio transmission performance. However, the substantially high transmission power associated with radio frequency (RF) communication increases the difficulty of miniaturization of the transmission components.

Power amplifier (PA) is a major component of a wireless communication device. A PA can be fabricated on a semiconductor integrated circuit (IC) chip to provide signal amplification with substantial power. The power amplifier chip can be interconnected with certain passive components such as inductors, capacitors, resistors, and transmission lines for operation controls and for providing impedance matching to the input and output RF signals.

Some wireless communication devices can communicate in more than one frequency band. For example, a wireless communication device may support the 802.11a standard at 5 GHz and 802.11b (and/or 802.11g) standard 2.4 to 2.5 GHz. For cost reduction and size constraints, it is desirable that both frequency bands utilize the same antenna in the wireless communication device. To achieve the desired levels of output power, separate output power amplifiers and transmission paths are needed to amplify and convey transmit data for each frequency band to separate inputs of a diplexer having and output coupled to a common antenna. The output power amplifiers tend to generate non-linear distortion so that certain amounts of harmonic energy are radiated at their outputs. This harmonic energy is particularly problematic given that the second harmonic of the low frequency band (e.g., approximately 4.8-5.0 GHz) is in the proximity range of the second 5 GHz band. Thus, it is difficult to filter the second harmonics of the low frequency band (at 2.4-2.5 GHz) in the transmission path of the high-frequency band at 5 GHz. Although pass filters may be employed for each transmission path to prevent undesired signal from an active transmission path from being directly conveyed to the diplexer, the second harmonic energy from the low-frequency band transmission path coupled or leaked into the high-frequency band transmission path is passed with very low loss. For example, any second harmonic energy of the low frequency signal coupled into the high-frequency band transmission path will also pass through the diplexer to the antenna causing the radio to fail necessary compliance harmonic specifications promulgated in tire U.S. by the Federal Communications Commission (FCC) and internationally by the European Telecommunications Standards Institute (ETSI). Another attempt to control the second harmonic coupling (as described in US Patent Publication 20040127185) uses a trap circuit such as an LC circuit to attenuate the second harmonic energy at the higher frequency band.

A major disadvantage of the above described conventional techniques is that the circuit features intended for absorbing second harmonic energies can also attenuate the signals in the higher frequency band. The problem is especially severe when the higher frequency band is within or overlaps with the doubling of the low-frequency band.

SUMMARY

In a general aspect, die present invention relates to an amplifier circuit that includes a first power amplifier that can produce a first amplified signal in response to a first input signal in a first frequency band: a second power amplifier that can produce a second amplified signal in response to a second input signal in a second frequency band, wherein a center frequency of the second frequency band is higher than the a center frequency of frequency band; a control circuit that can turn on or turn off the first power amplifier and turn on or turn off the second power amplifier; and a shunting circuit coupled to an output of the second power amplifier, wherein the shunting circuit can attenuate harmonic signals from the first frequency band under the control of the control circuit.

In another general aspect, the present invention relates to an amplifier circuit that includes a first power amplifier having a first power control terminal, wherein the first power amplifier can produce a first amplified signal in response to a first input signal in a first frequency band; a second power amplifier having a second power control terminal, wherein a center frequency of the second frequency band is higher than the a center frequency of frequency band, wherein the second input signal has a higher frequency man the first input signal: a control circuit that can send a first control signal to the first power control terminal of the first power amplifier to turn on or turn off the first power amplifier and to send a second control signal to the second power control terminal of the second power amplifier to turn on or turn off the second power amplifier: and a shunting circuit coupled to an output of the second power amplifier, wherein the shunting circuit can be activated by the first control signal to attenuate harmonic signals from the first power amplifier.

In yet another general aspect, the present invention relates to an integrated power amplifier module that includes a first power amplifier that can produce a first amplified signal in response to a first input signal in a first frequency band; a second power amplifier that can produce a second amplified signal in response to a second input signal in a second frequency band, wherein a center frequency of the second frequency band is higher than the a center frequency of frequency band: a control circuit that can turn on or turn off the first power amplifier and configured to turn on or turn off the second power amplifier; and a shunting circuit coupled to an output of the second power amplifier, wherein the shunting circuit can attenuate harmonic signals of the first frequency band under the control of the control circuit, wherein the first power amplifier, the second power amplifier, the control circuit, and the shunting circuit are constructed on a single semiconductor die.

Implementations of the system may include one or more of the following. The shunting circuit can attenuate harmonic signals of the first frequency band when the first power amplifier is turned on by the control circuit. The amplifier circuit can further include a diplexer configured to receive the first amplified signal from the first power amplifier and the second amplified signal from the second power amplifier, wherein the diplexer can send at least one of the first amplified signal and the second amplified signal to an antenna. The shunting circuit can bypass the output of the second power amplifier to ground when the second power amplifier is turned off by the control circuit. The shunting circuit can pass the second amplified signal to the diplexer when the second power amplifier is turned on by the control circuit. The amplifier circuit can further include a trap circuit coupled between the shunting circuit and the ground, wherein the trap circuit is configured to attenuate a harmonic signal from the first frequency band. The shunting circuit can include a first transistor coupled between art output of the second power amplifier and an output terminal; and a second transistor coupled between the output of the second power amplifier and the ground, wherein the first transistor and the second transistor are controlled by the control circuit, wherein the first transistor and the second transistor are configured to attenuate harmonics from the first frequency band when the first power amplifier is turned on and to pass the second amplified signal to the output terminal when the second power amplifier is turned on by the control circuit. The amplifier circuit can further include a diplexer configured to receive the first amplified signal from the first power amplifier and coupled to the output terminal, wherein the diplexer is configured to send at least one of the first amplified signal and the second amplified signal to an antenna. The first power amplifier can include a first power control terminal configured to receive a first control signal from the control circuit to turn on or turn off die first power amplifier and the second power amplifier comprises a second power control terminal configured to receive a second control signal from the control circuit to turn on or turn off the second power amplifier. The shunting circuit can include a resistor connected between the power control terminal of the first power amplifier and an output of the second power amplifier; and a PIN diode coupled between the ground and the output of the second power amplifier, wherein the control circuit is configured to send the first control signal to turn on the first power amplifier and to activate the PIN diode to attenuate harmonic signals from the first power amplifier. The second frequency band can overlap with at least a portion of a harmonic band from the first frequency band.

Embodiments may include one or more of the following advantages. The disclosed amplifier circuits can provide high-linearity radio frequency power amplification for dual or multiple frequency bands with significantly reduced noise and unwanted signal oscillations. The disclosed amplifier circuits can effectively suppress harmonic signals from low-frequency band transmission path without attenuating signals in the higher frequency band.

The disclosed amplifier circuits are especially advantageous over some conventional power amplifiers when the higher frequency band is within or overlaps with the harmonic signals of the low-frequency band in a wireless device. For example, the disclosed amplifier circuits can be applied to wireless communication devices that support multiple standards such as WiMax and WiFi. The disclosed amplifier circuits can suppress the second harmonics from a low-frequency band operating at 2.3-2.7 GHz without attenuating the signals in a high-frequency band operating at 5 GHz even if 5 GHz overlaps with the second harmonic frequency (4.6-5.4 GHz) of the low frequency band, the frequency range of harmonic signals from the low frequency band transmission path.

Another advantage of the disclosed amplifier circuits is mat the components involved are highly integrated. One or more of the power amplifiers, the components for suppressing harmonics, the control circuit, and the diplexer can be integrated in a single IC chip. The disclosed power amplifier circuits can be more compact compared to some prior art implementations.

BRIEF DESCRIPTION OF THE DRAWINGS

The following drawings, which are incorporated in and from a part of the specification, illustrate embodiments of the present specification and, together with the description, serve to explain the principles of the specification.

DETAILED DESCRIPTION

Figure 1:
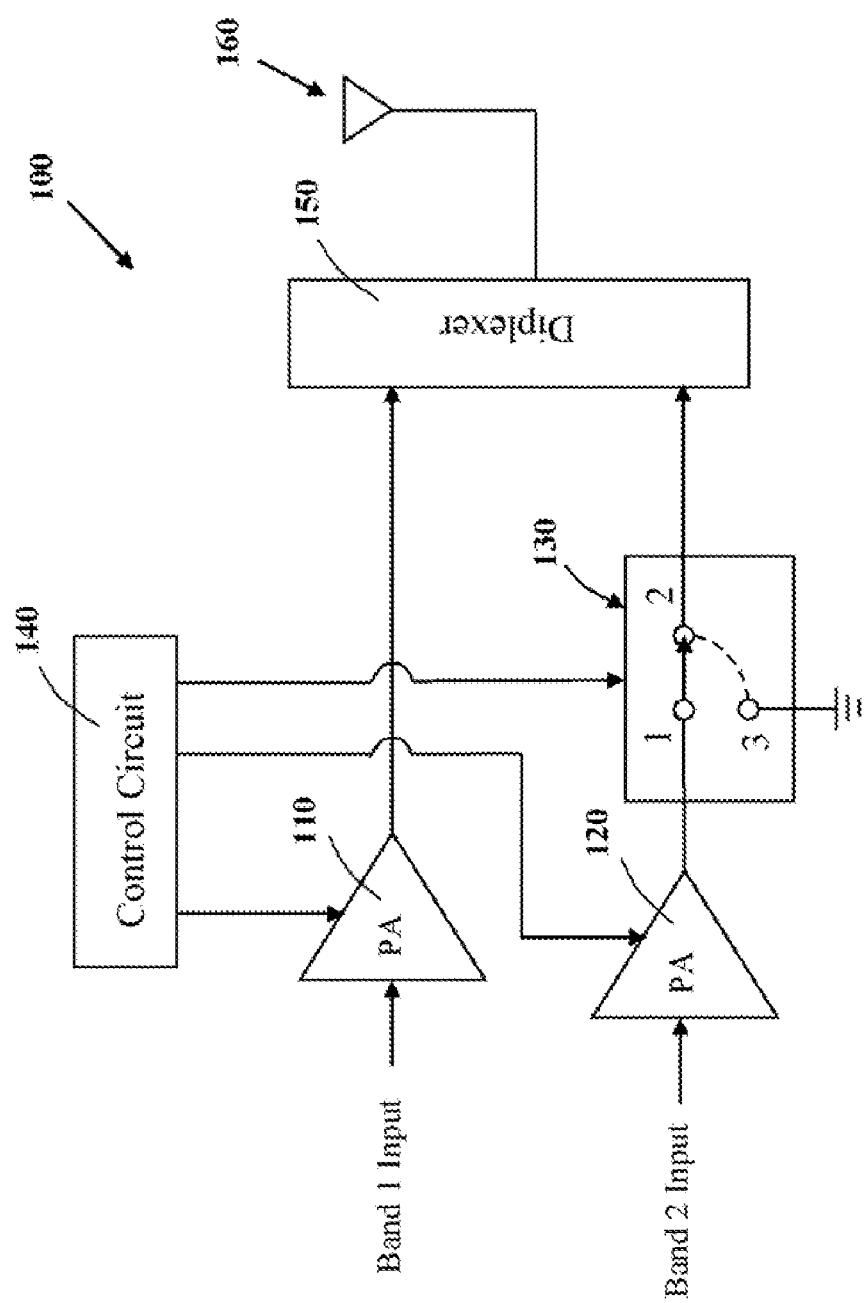
FIG. 1 is a schematic diagram for a power amplifier circuit having harmonic suppression.

A power amplifier circuit 100, referring to FIG. 1, includes a power amplifier 110 for amplifying signals in a low frequency band. Band 1, and a power amplifier 120 for amplifying signals in a high frequency band, Band 2. Each of the Band 1 and Band 2 can be characterized by a center frequency. The center frequency of Band 2 is higher than the center frequency of Band 1. The two frequency bands can support different standards such as WiFi, WiMax, and 802.11b (and/or 802.11g). For example. Band 1 can operate at 2.3-2.7 GHz. Band 2 can operate at about 5 GHz. The second harmonic band for Band 1 is thus at 4.6-5.4 GHz, which may overlap with the frequency band of Band 2.

In the present specification, the term 'harmonic band' refers to the frequency band for the harmonic signals from a lower frequency band. The signal path for each frequency band can be referred to as a transmission path. A first transmission path refers to the amplification path for Band 1 and a second transmission path refers to the amplification path for Band 2.

The power amplifier circuit 100 also includes a shunting circuit 130 and a control circuit 140. The control circuit 140 can control power input to the power amplifiers 110 and 120. The control circuit 140, as described in more detail below, can also control the shunting operations of the shunting circuit 130. A duplexer cart combine the amplified signals from the power amplifiers 110 and 120 and supply the amplified signals to an antenna 160.

The control circuit 140 can send control signals turn on or turn off the power supplies to the power amplifiers 110 and 120. For example, the control circuit 140 can turn on power amplifier 110 and turn off the power amplifier 120 to allow signals in Band 1 to be amplified, then to pass through the diplexer 150 and to be transmitted by the antenna 160. The diplexer 150 includes a low-pass filter or a band-pass filter for the low-frequency band transmission path and a high-pass filter or a band-pass filter for the high-frequency band transmission path. The control circuit 140 can also turn on power amplifier 120 and turn off the power amplifier 110 to allow signals in Band 2 to be amplified, then to pass through the diplexer 150 and to be transmitted by the antenna 160. The power control signals from the control circuit 140 can be respectively sent to the power-control Vpc terminals in the power amplifiers 110 and 120. In one example, a high voltage at the power-control Vpc terminal can turn on the power amplifier 110 or 120. A low voltage at the power-control Vpc terminal can turn off the power amplifier 110 or 120.

The shunting circuit 130 can be logically represented by a switch having three terminals 1, 2, and 3. Terminal 1 is connected to output of the power amplifier 120. Terminal 2 is connected to the diplexer 150. Terminal 3 is connected to the ground. The control circuit 140 can control the shunting circuit 130 to connect terminal 1 to either terminal 2 or terminal 3. The shunting circuit 130 is deactivated when terminal 1 is connected to terminal 2. The shunting circuit 130 is activated when terminal 1 is connected to terminal 3 (e.g. ground for the amplifier circuit in FIG. 1).

When the power amplifier 110 is turned on, terminal 1 is connected to terminal 3 under the control of the control circuit 140. The output of the power amplifier 120 is disconnected from the diplexer 150 and shunted to the ground. Harmonic signals originated from the low-frequency band transmission path may be coupled or leaked to the high-frequency band transmission path because the transmission circuits for the two transmission paths are typically constructed in vicinity in a integrated circuit on a same substrate. Without proper attenuation, the harmonic signals from the low-frequency band transmission path can pass through the high-pass filter or the band filter in the diplexer 150, which leads to non-linearity in the output RF signal. Harmonic signals from the low-frequency band transmission path are thus bypassed to the ground and the open circuit at the shunting 130 prevents the harmonic signals from reaching the diplexer 150. The quality of the output signal to the antenna is therefore much enhanced.

When the amplifier circuit 100 amplifies signals in Band 2, the power amplifier 120 is turned on; the power amplifier 110 is turned off. Terminal 1 in the shunting circuit 130 is controlled by the control circuit 140 to connect to terminal 2. The amplified signals from the power amplifier 120 in Band 2 can propagate to the diplexer 150 and then be transmitted by the antenna 160.

The logic states of the amplifier circuits 100, 200 and the shunting circuit 130 are illustrated in Table 1.

TABLE 1

Logic States for the power amplifiers and the shunting circuit

| Transmission Mode | PA in Band 1 | PA in Band 2 | Shunting Circuit |
|---|---|---|---|
| Band 1 | ON | OFF | ACTIVATED |
| Band 2 | OFF | ON | DEACTIVATED |

One advantage for the amplifier circuits 100 is that the associated shunting circuit 130 does not attenuate high-frequency signals when the power amplifier 110 is off and the power amplifier 120 is on. This feature overcomes a major shortcoming in some conventional amplifier circuit where signals in the high frequency band may be indiscriminately attenuated even when the high frequency signals are to be amplified. The described advantage of the disclosed amplifier circuit is especially important when the Band 2 operates at or around twice or other multiple of the frequency of Band 1. For example, Band 1 can operate in a frequency range of 2.3-2.7 GHz and Band 2 can operate at about 5 GHz. The high frequency signals at about 5 GHz is not attenuated when the power amplifier 120 is on (as is the case in some conventional systems). This advantageous feature assures gain uniformity across the high frequency band in the disclosed amplifier circuit.

Figure 2:
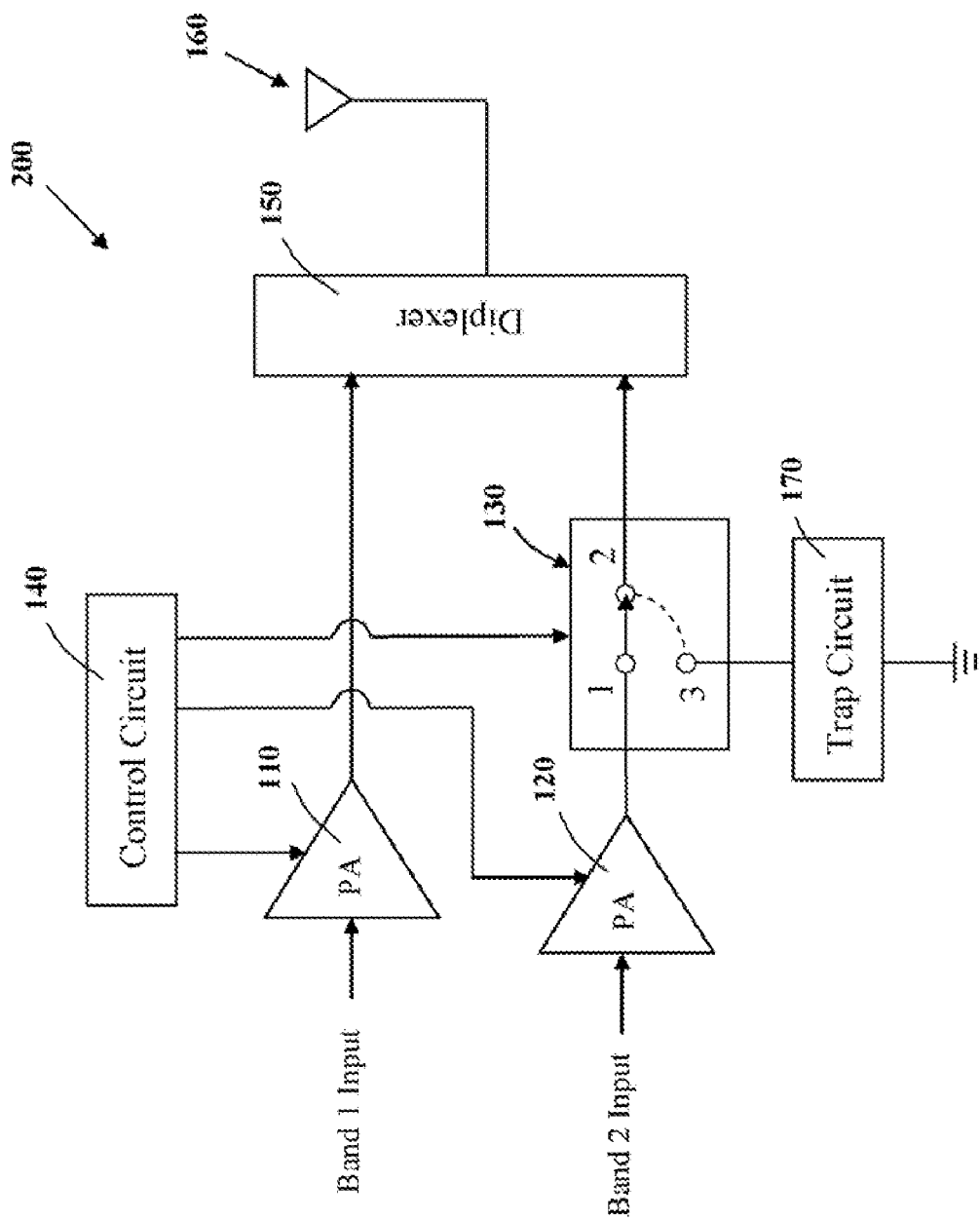
FIG. 2 is a schematic diagram for another power amplifier circuit having harmonic suppression.

In another implementation, referring to FIG. 2, an amplifier circuit 200, includes an additional trap circuit 170 between the terminal 3 in the shunting circuit 130 and the ground. The trap circuit 170 can be implemented, for example, by a resonant circuit such as an LC circuit that is designed to have low impedance at the frequencies of the harmonic signals from the low-frequency band transmission path. For example, if Band 1 operates at 2.3-2.7 GHz, the resonance frequency from the resonant circuit can be designed to be at around 4.6-5.4 GHz. The addition of the trap circuit 170, although optional, can further absorb the harmonic signals from the low-frequency band transmission path.

Figure 3:
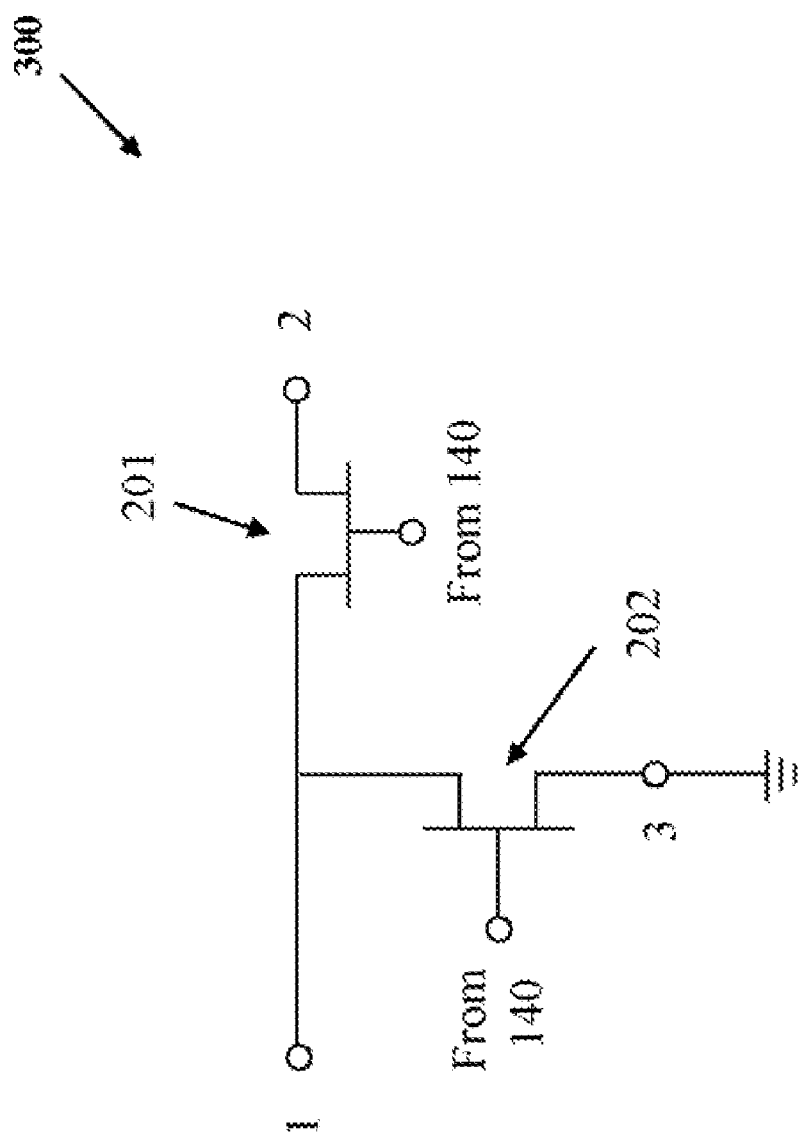
FIG. 3 is a schematic diagram for a shunting circuit compatible with the power amplifier circuits shown in FIG. 1 and FIG. 2.

The shunting circuit 130 can be implemented by circuit components such as PIN diodes. High Electron Mobility Transistors (HEMT), Metal-Semiconductor Field Effect Transistors (MESFET), and Complementary metal-oxide-semiconductor (CMOS) circuits, etc. FIG. 3 shows a schematic diagram of a shunting circuit 300 that is compatible with the shunting circuit 130 in the power amplifier circuits 100 and 200. Tire shunting circuit 300 includes a transistor 201 connected between the terminal 1 and terminal 2 and a transistor 202 connected between the terminal 1 and terminal 3 (ground). The gates of the transistor 201 and the transistor 202 can receive control signals from the control circuit 140. For example, the shunting circuit 300 is activated when the transistor 202 is turned on and the transistor 201 is turned off by the control circuit 140. The shunting circuit 300 can be deactivated when the transistor 201 is turned on and the transistor 202 is turned off by the control circuit 140.

Figure 4:
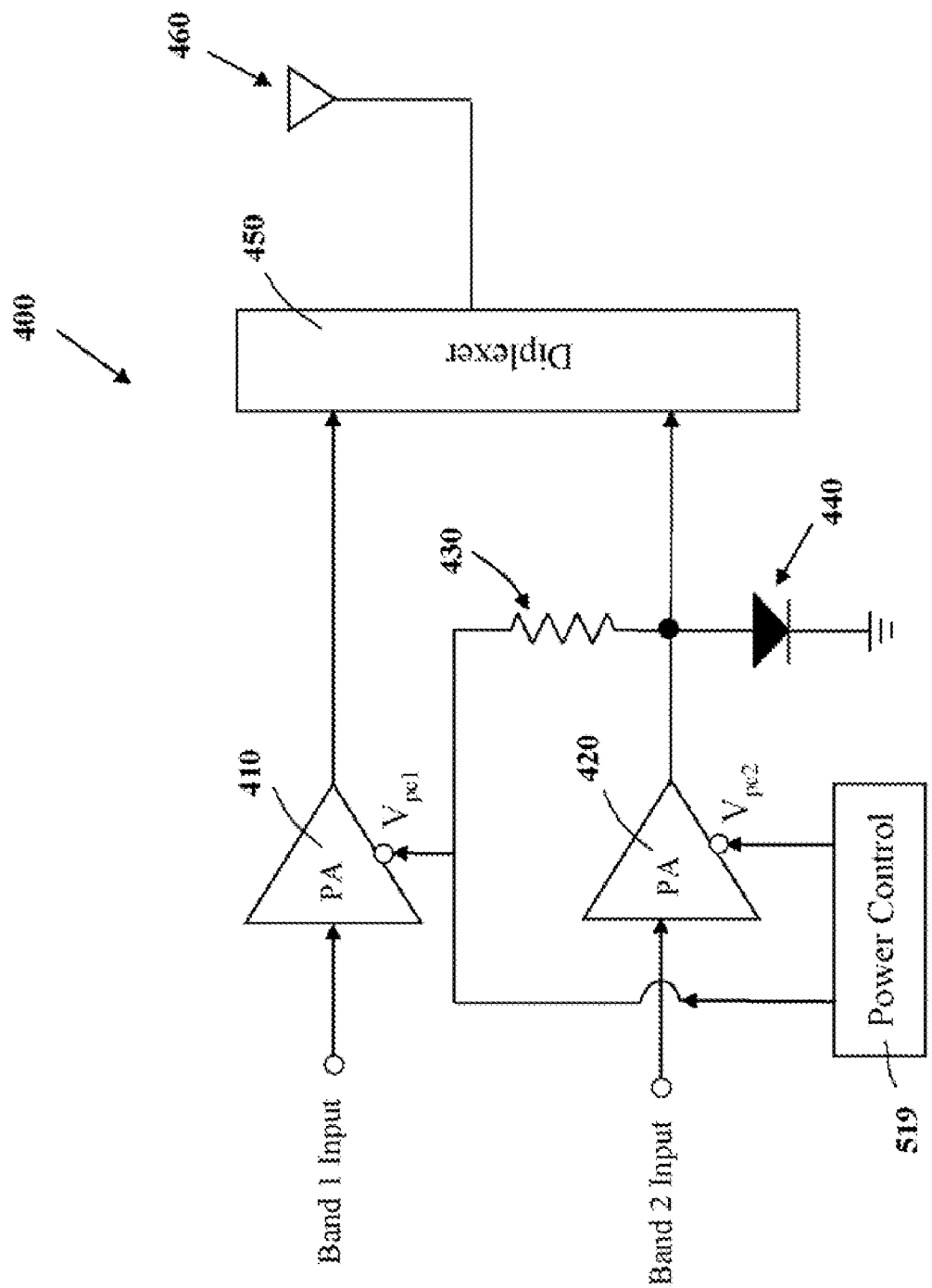
FIG. 4 illustrates an implementation of a power amplifier circuit having harmonic suppression.

FIG. 4 illustrates another implementation of a power amplifier circuit having harmonic suppression. A power amplifier circuit 400 includes a power amplifier 410 for amplifying signals in a low frequency band, Band 1, and a power amplifier 420 for amplifying signals in a high frequency band, Band 2. The two frequency bands can support different standards such as WiFi, WiMax, and 802.11b (and/or 802.11g). For example, Band 1 can operate at 2.3-2.7 GHz, Band 2 can operate at about 5 GHz. The second harmonic band for Band 1 is thus at 4.6-5.4 GHz, which may overlap with the Band 2.

The power control terminal Vpc1 of the power amplifier 410 can receive a control signal from a power control 519 (shown in FIG. 5 as described below). The power control terminal Vpc2 of the power amplifier 420 can also receive a control signal from a power control 519 (shown in FIG. 5 as described below). For example the power amplifiers 410, 420 can be turned on when high-voltage signals are respectively received at the power control terminals Vpc1 and Vpc2.

The power amplifier circuit 400 also includes a shunting circuit that includes a resistor 430 and a PIN diode 440 that is connected to the ground. A PIN diode refers a diode with a wide, un-doped intrinsic semiconductor region between p-type semiconductor and n-type semiconductor regions of the diode. A PIN diode obeys the standard diode equation only for slow-varying signals. At higher frequencies, the diode looks like an almost perfect (very linear, even for large signals) resistor. The high-frequency resistance is inversely proportional to the DC bias current through the diode. A PIN diode, suitably biased, therefore can act as a variable resistor. This high-frequency resistance may vary over a wide range. The PIN diode 440 can thus effectively attenuate high frequency harmonic signals when a high voltage signal is applied to the Vpc1 terminal and the resistor 430.

In one implementation, turn-on voltage for Vpc1 can be 2.8 V. The resistor 430 can have a resistance of 1K Ohm, which can drive a current of about 1 mA to the PIN diode 440. This current can activate the PIN diode to shunt die harmonic signals from the low-frequency band transmission path at the output of the power amplifier 420. Furthermore, the PIN diode 440 can be implemented in a very compact area. The compact implementation of the shunting circuit allows the power amplifier circuit 400 to be highly integrated and implemented in an integrated circuit on a semiconductor substrate.

The power amplifier circuit 400 can operate as follows. When signals from Band 1 are to be amplified, Vpc1 is controlled at high voltage and Vpc2 is controlled at low voltage. The power amplifier 410 is turned on to amplify signals in Band 1. The power amplifier 410 is turned off. The high voltage at Vpc1 raises the bias voltage for the resistor 430 and across the PIN diode 440 to make the PIN diode 440 conductive. The PIN diode can effectively shunts harmonic signals from the low-frequency band transmission path to the ground. When signals from Band 2 are to be amplified, Vpc1 is controlled at low voltage and Vpc2 is controlled at high voltage. The power amplifier 410 is turned off. The power amplifier 420 is turned on to amplify signals in Band 2. The low bias voltage at the Vpc1 makes the PIN diode 440 non-conductive for RF signals. The amplified signals from the power amplifier 420 can pass to the diplexer 450 and then be transmitted by antenna 460.

Figure 5:
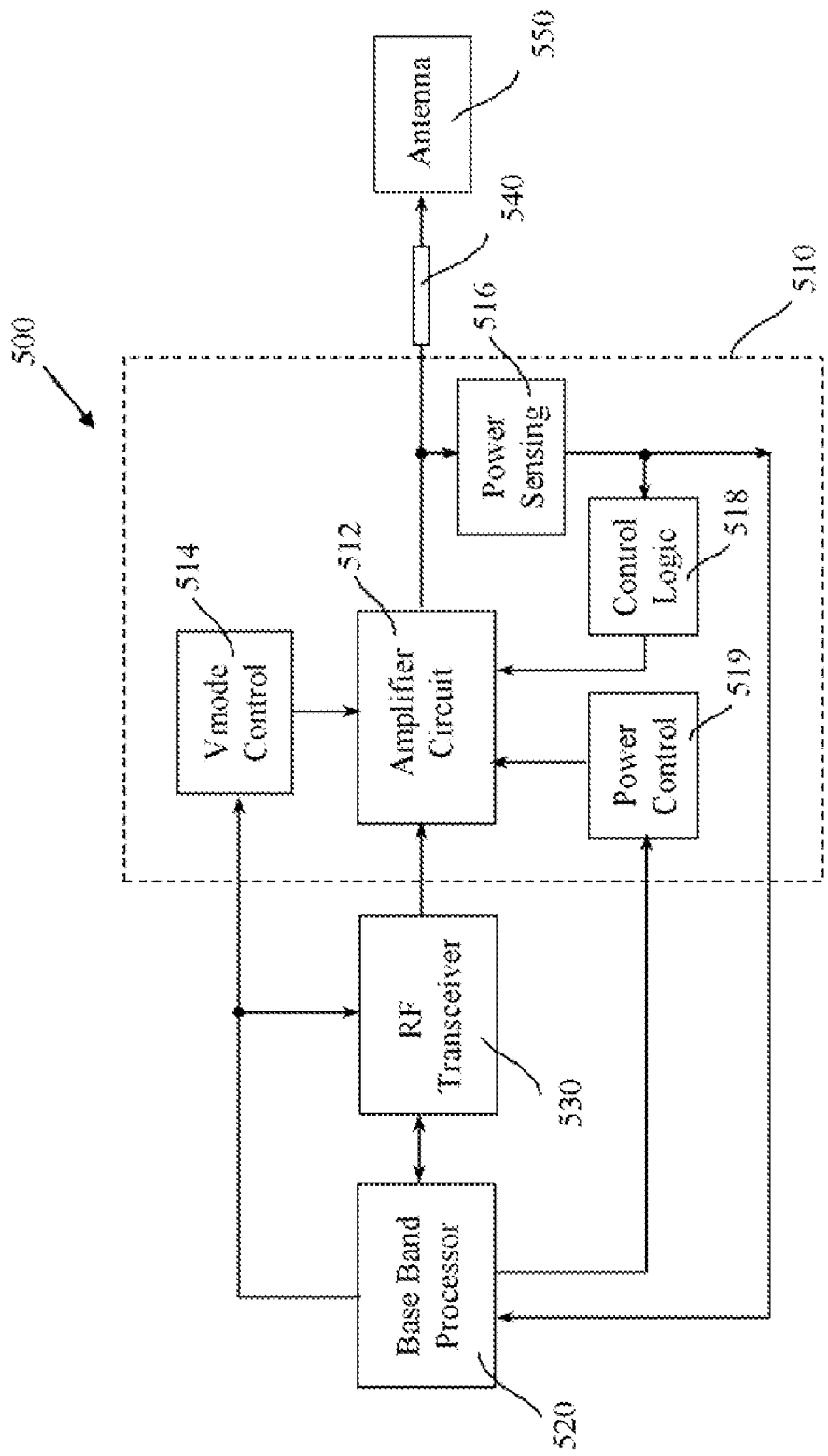
FIG. 5 illustrates an exemplified implementation of an amplifier circuit having harmonic suppression in a wireless communication device in accordance with the present specification.

FIG. 5 illustrates an exemplary application of an amplifier circuit 512 in a wireless communication device 500. The wireless communication device 500 can for example be a PDA, a WiFi device, a WiMax device, or a cellular phone. The amplifier circuit 512 can be implemented by the amplifier circuit 100, 300, or 400 as previously described. The wireless communication device 500 can include abase band processor core 520, an RF transceiver 530, a power amplifier module 510 capable of operating at multiple frequency bands, and a 50-ohm impedance transmission line or micro strip 540 and an antenna 550. The power amplifier module 510 can include the amplifier circuit 512, a Vmode control circuit 514, a power sensing circuit 516, a control logic circuit 518, and a power control circuit 519. The control circuits 130 in the amplifier circuits 100 and 200 can include at least portions of the power control 519 and the control logic 518. The power control circuit 519 can also provide control signals for the power control terminals Vpc1 and Vpc2 of the power amplifiers 410, 420 in the power amplifier circuit 400. In some embodiments, the power amplifier module 510 is fabricated on an integrated circuit (IC) module that can be implemented on a single semiconductor chip.

The amplifier circuit 512 can include a biasing circuit for providing biasing signals to the one or more power amplifiers (e.g. 110, 120, 410, and 420) and power drivers in the amplifier circuit 512. The biasing circuit can control the bias of the power amplifiers and the power drivers in response to a control signal from the control circuit 140 (that can include at least portions of the control logic 518 and the power control 519). The control circuit 140 can produce the control signals to the biasing circuit based on a power sensing signal received from the power sensing circuit 516.

The amplifier circuit 512 can also include impedance matching circuits for input and output signals. Details of impedance matching circuits are described commonly assigned U.S. patent application Ser. No. 10/041,863, filed on Oct. 22, 2001, titled "Multilayer RF Amplifier Module", by Wang, et al., the content of which is incorporated by reference.

The base band processor 520 can generate and process digitally modulated signals. The frequency is up-converted by the RF transceiver 530 to a RF signal suitable for transmission. The RF signal is amplified by the PA module 510 that produces amplified RF signal for transmission by the antenna 550. The PA module 510 can be turned ON/OFF by the power control signal produced by the power control circuit 519.

In some embodiments, the amplifier circuit 512 can be controlled by an open loop by the base band processor 520 via Vmode control circuit 514. The Vmode control circuit 514 can produce a Vmode control signal to control and internal settings of the biasing circuits under the control of the base band processor 520. The base band processor 520 has the knowledge of the digital signal modulation type and tire linear output requirement. For example, when the device is transmitting at high power, the Vmode control signal can control the biasing circuit to activate the main power amplifier. When the device is transmitting at low power, the Vmode control signal can control the biasing circuit to activate the auxiliary power amplifier. As a result, power consumption and output distortion can be minimized.

To provide excellent output linearity, a power amplifier must maintain a constant gain (which is defined as the ratio of the output signal power level to the input signal power level) over a wide output range. However, the power amplifier can be driven close to saturation at high output power level, which makes it difficult to maintain a constant gain. The quality of digital communication, especially the quality degrades at high output power level, can commonly be measured by Error Vector Magnitude (EVM), Bit Error Rate (BER), Packet Error Rate (PER), and Adjacent Channel Power Ratio (ACPR).

In some embodiments, the amplifier circuit 512 can be controlled by a close loop by the power sensing circuit 516. The output linearity can be improved by a feedback control based on the sensing of the output power level. The power sensing circuit 516 can measure the power of the output RF signal and send a power sensing signal to the base band processor 520. The base band processor 520 can set the transmission power level by varying the input signal to the RF transceiver 530 and thus to the PA module 510 in accordance to the power sensing signal received by the power sensing circuit 516. The control logic circuit 518 can process the power-sensing signal from the power sensing circuit 516 and compute a quality or a magnitude of the output signal. A power-sensing control signal is then generated to control the biasing circuit in response to the quality, or the magnitude, or a combination thereof of the output signal. Other details of the power sensor circuit are disclosed in commonly assigned U.S. patent application Ser. No. 10/385,059 tilted "Accurate Power Sensing Circuit for Power Amplifiers" Mar. 9, 2003, by Ichitsubo et al., the disclosures of which related application are incorporated herein by reference.

The control logic circuit 518 can receive and process the power-sensing control signal, and output a processed power-sensing control signal to control the amplifier circuit 512. The processed power-sensing control signal can be a function of the quality and/or the magnitude of the amplified radio frequency signals from the amplifier circuit 512. The control logic circuit 518 can improve output linearity of the amplifier circuit 512 by adjusting the bias of the biasing circuits in accordance to tire actual output power measured by the power sensing circuit 516. It can reduce gain saturation and maintain a more constant gain, which can improve the output linearity in a wide power range. Furthermore, the quality of digital communication can also be improved by an external controller that can adjust the amplitude of the input. RF signal based the known relationship between digital communication quality and output power level.

In some embodiments, the PA module 510 can be fabricated on an integrated circuit (IC) module that can be implemented on a single semiconductor chip (or die). The PA module 510 can also be implemented as an integrated circuit on a common semiconductor substrate which can be a multiplayer printed circuit board (PCB), lead frame, lower-temperature co-fired ceramics (LTCC), or other suitable electronic materials. The substrate includes metal Pins adapted to receive connecting terminals of integrated circuits including the first stage power amplifier, the main and the auxiliary power amplifiers, the biasing circuit, power sensing circuit, Vmode control circuit, and optional control logic circuit. The amplifier IC chip can include electrically conductive layers and patches for proper grounding and cooling of the PA module 510.

The PA module provides a unitary or common component which may be conveniently assembled in a RF transmission device, with correspondingly simplified assembly, compact sizes, and enhanced RF amplification performance. In accordance with the present invention, the term "module" refers to such a unitary device for wireless communications, comprising integrated power amplifiers and other circuitry and auxiliary electronic components. The disclosed PA module can be applied to a wide range wireless communication devices such as cellular phone, mobile computers, and handheld wireless digital devices. The PA module has a miniature size of a few millimeters. Other details about power amplifier modules are disclosed in commonly assigned U.S. patent application Ser. No. 11/486,465 tilted "Thermally distributed integrated power amplifier module", filed Jul. 16, 2006, by Ichitsubo et al., the disclosures of which related application are incorporated herein by reference.

It is understood the disclosed amplifier circuits can be compatible with other variations without deviating from the spirit of the present application. For example, the shunting circuit can be implemented in many different tonus and with different components to provide similar functions. The disclosed amplifier circuit can amplify signals in more than two frequency bands. The disclosed circuit can be applied to attenuate harmonics at two (i.e. second harmonics), three, or oilier multiple of a low frequency signal in one of the transmission paths in the disclosed amplifier circuit. The disclosed amplifier circuit can also include several stages in each power amplifier. An amplifier driver can also be included before a power amplifier.

The disclosed amplifier circuits are suitable to applications in various wireless data and voice communications standards and protocols, including Orthogonal Frequency-Division Multiplexing (OFDM), Orthogonal Frequency-Division Multiplexing Access (OFDMA), Code Division Multiple Access (CDMA), Wideband Code Division Multiple Access (WCDMA), High-Speed Downlink Packet Access (HSDPA), High-Speed Packet Access (HSPA), Ultra Mobile Broadband (UMB), Long Term Evolution (LTE), WiMax, WiBro, WiFi, WLAN, and others. The disclosed amplifier circuits are also suitable for high frequency operations by utilizing Gallium Arsenide Heterojunction Bipolar Transistors (GaAs HBT).

What is claimed is:

1. An amplifier circuit, comprising:
  a first power amplifier configured to produce a first amplified signal in response to a first input signal in a first frequency band, wherein the output of the first power amplifier is not coupled to a trap circuit;
  a second power amplifier configured to produce a second amplified signal in response to a second input signal in a second frequency band, wherein a center frequency of the second frequency band is higher than the center frequency of the first frequency band;
  a control circuit configured to turn on or turn off the first power amplifier and configured to turn on or turn off the second power amplifier; and
  a shunting circuit coupled to an output of the second power amplifier, wherein the shunting circuit comprises a shunting switch that is configured to bypass harmonic signals from the first frequency band to the ground under the control of the control circuit.

2. The amplifier circuit of claim 1, wherein the shunting circuit is configured to attenuate harmonic signals of the first frequency band when the first power amplifier is turned on by the control circuit.

3. The amplifier circuit of claim 1, further comprising a diplexer configured to receive the first amplified signal from the first power amplifier and the second amplified signal from the second power amplifier, wherein the diplexer is configured to send at least one of the first amplified signal and the second amplified signal to an antenna.

4. The amplifier circuit of claim 3, wherein the shunting switch in the shunting circuit is configured to bypass the output of the second power amplifier to the ground when the second power amplifier is turned off by the control circuit.

5. The amplifier circuit of claim 3, wherein the shunting switch in the shunting circuit is configured to pass the second amplified signal to the diplexer when the second power amplifier is turned on by the control circuit.

6. The amplifier circuit of claim 1, further comprising a trap circuit coupled between the shunting switch and the ground, wherein the trap circuit is configured to attenuate a harmonic signal from the first frequency band.

7. The amplifier circuit of claim 1, wherein the shunting switch comprises:
  a first transistor coupled between an output of the second power amplifier and an output terminal; and
  a second transistor coupled between the output of the second power amplifier and the ground, wherein the first transistor and the second transistor are controlled by the control circuit, wherein the first transistor and the second transistor are configured to attenuate harmonics from the first frequency band when the first power amplifier is turned on and to pass the second amplified signal to the output terminal when the second power amplifier is turned on by the control circuit.

8. The amplifier circuit of claim 7, further comprising a diplexer configured to receive the first amplified signal from the first power amplifier and coupled to the output terminal, wherein the diplexer is configured to send at least one of the first amplified signal and the second amplified signal to an antenna.

9. The amplifier circuit of claim 1, wherein the first power amplifier comprises a first power control terminal configured to receive a first control signal from the control circuit to turn on or turn off the first power amplifier and the second power amplifier comprises a second power control terminal configured to receive a second control signal from the control circuit to turn on or turn off the second power amplifier.

10. The amplifier circuit of claim 1, wherein the shunting switch comprises:
  a first terminal coupled to an output of the second power amplifier;
  a second terminal coupled to the output of the amplifier circuit; and
  a third terminal coupled to the ground, wherein the switch is configured to connect the first terminal and the third terminal to bypass harmonic signals from the first frequency band to the ground under the control of the control circuit.

11. The amplifier circuit of claim 1, wherein the second frequency band overlaps with at least a portion of a harmonic band from the first frequency band.

12. An amplifier circuit, comprising:
  a first power amplifier having a first power control terminal, wherein the first power amplifier is configured to produce a first amplified signal in response to a first input signal in a first frequency band, wherein the output of the first power amplifier is not coupled to a trap circuit;

a second power amplifier having a second power control terminal, wherein the second power amplifier is configured to produce a second amplified signal in response to a second input signal in a second frequency band, wherein a center frequency of the second frequency band is higher than the center frequency of the first frequency band;

a control circuit configured to send a first control signal to the first power control terminal of the first power amplifier to turn on or turn off the first power amplifier and to send a second control signal to the second power control terminal of the second power amplifier to turn on or turn off the second power amplifier; and a shunting circuit coupled to an output of the second power amplifier, wherein the shunting circuit comprises a shunting switch that is configured to be activated by the first control signal to bypass harmonic signals from the first power amplifier to the ground.

13. The amplifier circuit of claim 12, wherein the shunting circuit is activated to attenuate harmonic signals from the first power amplifier when the first control signal turns on the first power amplifier.

14. The amplifier circuit of claim 12, further comprising a diplexer configured to receive the first amplified signal from the first power amplifier and the second amplified signal from the second power amplifier, wherein the diplexer is configured to send at least one of the first amplified signal and the second amplified signal to an antenna.

15. The amplifier circuit of claim 14, wherein the shunting switch in the shunting circuit is configured to bypass the output of the second power amplifier to the ground when the second power amplifier is turned off by the control circuit.

16. The amplifier circuit of claim 12, wherein the shunting switch is configured to pass the second amplified signal to the diplexer when the second power amplifier is turned on by the control circuit.

17. The amplifier circuit of claim 12, wherein the shunting switch comprises:
a first terminal coupled to an output of the second power amplifier;
a second terminal coupled to the output of the amplifier circuit; and
a third terminal coupled to the ground, wherein the switch is configured to connect the first terminal and the third terminal to bypass harmonic signals from the first frequency band to the ground under the control of the control circuit, wherein the switch is configured to connect the first terminal and the second terminal to allow the second amplified signal to output when the second power amplifier is turned on.

18. An integrated power amplifier module, comprising:
a first power amplifier configured to produce a first amplified signal in response to a first input signal in a first frequency band, wherein the output of the first power amplifier is not coupled to a trap circuit;
a second power amplifier configured to produce a second amplified signal in response to a second input signal in a second frequency band, wherein a center frequency of the second frequency band is higher than the center frequency of the first frequency band;
a control circuit configured to turn on or turn off the first power amplifier and configured to turn on or turn off the second power amplifier; and
a shunting circuit coupled to an output of the second power amplifier, wherein the shunting circuit comprises a shunting switch that is configured to bypass harmonic signals of the first frequency band to the ground under the control of the control circuit, wherein the first power amplifier, the second power amplifier, the control circuit, and the shunting circuit are constructed on a single semiconductor die.

19. The integrated linear power amplifier module of claim 18, further comprising a power sensing circuit coupled to the control circuit, wherein the power sensing circuit is configured to produce a power sensing signal in response to the power of at least one of the first amplified signal or the second amplifier signal.

20. The integrated linear power amplifier module of claim 18, further comprising a biasing circuit configured to control the bias of the first power amplifier and the second power amplifier, wherein a biasing circuit is coupled to the control circuit and is configured to control the bias of the first power amplifier and the second power amplifier in response to the power sensing signal.

21. The integrated linear power amplifier module of claim 18, further comprising:
a power control circuit configured to control the power supplied to the amplifier circuit in response to a first external signal; and
a Vmode control circuit configured to control the biasing mode of the biasing circuit in the amplifier circuit in response to a second external signal.

* * * * *